UNITED STATES PATENT OFFICE 2,522,489

TRITHIENYL-TRITHIO-ORTHOFORMATE

John W. Brooks, Wenonah, N. J., assignor to Socony-Vacuum Oil Company, Incorporated, a corporation of New York No Drawing. Application December 30, 1947, Serial No. 794,798

4 Claims. (Cl. 260—329)

This invention relates to a new composition of matter, namely, a trithienyl-trithio-orthoformate. More particularly, the present invention is directed to an improvement of various mineral oil fractions normally susceptible to the deleterious effects of oxidation by incorporation therein of a minor proportion of a trithienyl-trithio-orthoformate sufficient to stabilize the oil against oxidation.

As is well known to those familiar with the art, substantially all of the numerous fractions obtained from mineral oils and refined for their various uses are susceptible to oxidation. The susceptibility of an oil fraction to oxidation and the manner in which oxidation manifests itself within the oil varies with the type and degree of refinement to which the oil has been subjected and with the conditions under which it is used or tested; that is, the products formed in an oil fraction as a result of oxidation and the degree to which they are formed depend on the extent to which the various unstable constituents or constituents which may act as oxidation catalysts have been removed by refining operations and also upon the conditions of use.

The present invention is predicated upon the discovery that a new chemical compound, namely, trithienyl-trithio-orthoformate, greatly improves the oxidation characteristics of mineral oil fractions by incorporation therein of a minor proportion of this compound. It has been found that by the addition of trithienyl-trithio-orthoformate to a viscous mineral oil fraction, the development of undesirable products and properties such as acid, sludge, discoloration, and corrosiveness toward alloy-bearing metals, normally encountered under conditions of use, has been substantially inhibited.

The compound of this invention may be designated by the formula:

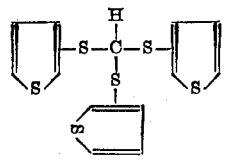

The thio-sulfur linkages of the above compound may be attached to either the 2-position or the 3-position of the thiophene rings. In the former instance, the compound will be tri-2-thienyl-trithio-orthoformate and in the latter instance, tri-3-thienyl-trithio-orthoformate. It is also contemplated that each of the thiophene rings may have one or more of the nuclear hydrogen atoms thereof replaced by other substituent groups such as alkyl, alkoxy, aryl, alicyclic, aralkyl, halogen, etc.

The above compound is suitably prepared by the action of formic acid on thiophenethiol. The latter material may be prepared by any one of numerous procedures heretofore described in the literature. Thus, 3-thiophenethiol may be produced by the process described in Chem. Inds. 60, 593–5, 620 (1947) and 2-thiophenethiol by the procedure described in Ber. Dtsch. Chem. Ges. 19, 1615 (1886) or in Ber. Dtsch. Chem. Ges. 20, 1756 (1887). Upon contacting thiophenethiol with formic acid at a temperature of between about 0° C. and about 50° C. for a period of from ½ to 4 hours and thereafter distilling the reaction product mixture to remove light boiling material, a residue of trithienyl-trithio-orthoformate is obtained. The molar ratio of thiophenethiol to formic acid employed will generally be between about 3 to 1 and about 6 to 1. The contact of reactants is suitably effected in the presence of dry HCl, which functions as a catalyst. Compounds other than HCl, such as $CaCl_2$, $BF_3$, $ZnCl_2$, $FeCl_3$, $NH_4Cl$, and the like may also be employed.

The following example will serve to illustrate a convenient method for synthesizing the compound of this invention:

Thirty and seven-tenths grams of formic acid (0.67 mole) and 232 grams of 3-thiophenethiol (2 moles) were mixed. Dry HCl was passed through the mixture maintained at a temperature of 5–15° C. for a period of 3 hours. At the end of this time the mixture was placed in a refrigerator for a period of 3 days and there maintained at an average temperature of about 10° C. The resulting reaction product was then washed with water and with petroleum ether, dried over anhydrous magnesium sulfate, and topped to a pot temperature of 200° C. under a pressure of one millimeter. The residual product of tri-3-thienyl-trithio-orthoformate so obtained was found to have a sulfur content of 55.6 per cent, the theoretical sulfur content being 53.6 per cent.

The compound of this invention has been found to be particularly valuable as an additive in the stabilization of viscous petroleum oils, such as transformer oils and technical white oils which are of a highly refined character and substantially free from unsaturated hydrocarbons and resinous compounds. Oils of this type are commonly made by refining petroleum distillates of the requisite viscosity by treatment with large quantities of sulfuric acid, including fuming sulfuric acid, followed by neutralization and clay filtration or redistillation. So far as the present invention is concerned, however, the method by which the highly refined character is imparted to the oils is unimportant.

The highly refined viscous petroleum oils, although generally stable against oxidation at atmospheric temperatures, tend to absorb atmospheric oxygen when heated, particularly when in contact with catalytic metals such as copper. The result of such oxidation is the production of acid compounds soluble in the oils. The oils thereby become unsuitable for their adapted uses and must be purified or replaced.

The effectiveness of the compound of this invention in stabilizing highly refined mineral oils against the deleterious effects of oxidation may be evaluated not only by actual use of the stabilized oils in transformers and machinery, but also by a laboratory test commonly known as the "German Tar Test," which has been found to give results comparable in degree with the results in actual use. In accordance with this method, a sample of 150 grams of the oil is maintained at a temperature of 120° C. and oxygen gas is bubbled through it slowly for 70 hours at a rate of 2 liters per hour. The sample is then titrated with alcoholic potash and the neutralization number of the oil thus determined. The neutralization number varies directly with the susceptibility of the oil to acid formation under the conditions of the test.

In the test specifically described herein, the base oil used was a highly refined oil which had been prepared by treating a coastal distillate with 40 pounds of 98 per cent sulfuric acid and 180 pounds of 103 per cent oleum per barrel (400 pounds) of oil, followed by a clay percolation. It had a specific gravity of 0.871, a flash point of 310° F., and a Saybolt Universal viscosity of 69 seconds at 100° F. Such an oil containing no additive when subjected to the aforementioned test was readily susceptible to oxidation and developed a neutralization number of about 20. The same oil containing 0.1 per cent of tri-3-thienyl-trithio-orthoformate when tested had an unexpectedly low neutralization number of 0.02, indicating the non-susceptibility of the stabilized oil toward oxidation.

It will thus be evident that the trithienyl-trithio-orthoformate of this invention is an extremely effective agent in inhibiting the development of acidity in a mineral oil when the same is subjected to oxidation conditions. The quantity of compound employed as stabilizer to inhibit the undesirable effects of oxidation in the oil may be varied, depending upon the character of the oil and the severity of the conditions to which it is exposed. While the stabilizing agent of this invention may be added to mineral oil fractions in an amount ranging from about 0.01 to about 5 per cent, it usually has its optimum effect in a quantity of the order of about 0.10 per cent.

I claim:

1. As a new composition of matter, trithienyl-trithio-orthoformate.

2. As a new composition of matter, tri-3-thienyl-trithio-orthoformate.

3. A process for preparing trithienyl-trithio-orthoformate, which comprises contacting thiophenethiol with formic acid at a temperature of between about 0° C. and about 50° C. for a period of from about ½ to about 4 hours and thereafter distilling the resulting reaction product mixture to remove light boiling material therefrom, yielding trithienyl-trithio-orthoformate as the residual product.

4. A process for preparing trithienyl-trithio-orthoformate, which comprises reacting thiophenethiol with formic acid at a temperature of between about 0° C. and about 50° C. while passing dry hydrogen chloride gas therethrough for a period of from about ½ to 4 hours and thereafter distilling the resulting reaction product mixture to remove light boiling material therefrom, yielding trithienyl-trithio-orthoformate as the residual product.

JOHN W. BROOKS.

REFERENCES CITED

The following references are of record in the file of this patent:

UNITED STATES PATENTS

| Number | Name | Date |
|---|---|---|
| 2,160,293 | Shoemaker et al. | May 30, 1939 |
| 2,376,338 | Browning | May 22, 1945 |